Figure 1:
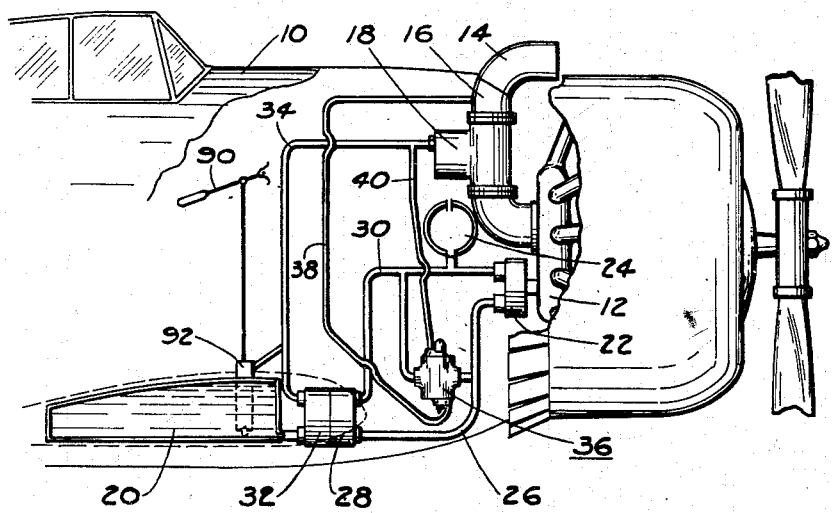

Feb. 1, 1944.   G. W. PONTIUS, 3D., ET AL   2,340,489
BYPASS VALVE
Filed March 14, 1940

INVENTORS
GEORGE W. PONTIUS III
BY SCHUYLER L. HANDY
A. R. McCrady
ATTORNEY

Patented Feb. 1, 1944

2,340,489

UNITED STATES PATENT OFFICE 2,340,489

BYPASS VALVE

George W. Pontius, III, South Bend, Ind., and Schuyler L. Handy, Edwardsburg, Mich., assignors to Bendix Aviation Corporation, South Bend, Ind., a corporation of Delaware Application March 14, 1940, Serial No. 323,900

2 Claims. (Cl. 137—153)

This invention relates to fuel systems and more particularly to a regulator valve for a hydraulically operated power fuel supply system.

In aircraft work, it has been common to use fuel pumps to supply fuel from the tank to the carburetor. The recent use of carburetors in which the fuel is metered while being maintained under positive pressure has emphasized the need for reliable fuel pumps, these carburetors requiring a substantial supply of fuel under pressure. In the past it has been common to place a fuel pump on the aircraft engine to pump fuel to the carburetor. However, since the fuel tanks are customarily in the airplane wing and the airplane motor is at a point above the airplane wing, this has required the use of suction to lift the fuel from the tank to the fuel pump. At high altitudes this suction results in vapor lock and cavitation in the fuel supply system. To avoid these difficulties, current practice has decreed that the fuel pump should be placed at a point below the fuel tank which necessarily requires that the fuel pump be at a point remote from the engine. Because the fuel pump is remote from the engine, new power means for driving the pump must be provided. Some installations have used electric motors to drive the pumps and others have used hydraulic power drives. Whatever power means is used must be capable of regulation to supply fuel under a constant pressure to the carburetor, regardless of the engine's needs.

The use of carburetors of the pressure feed type on current aircraft gives rise to exacting demands for fuel supply systems. Fuel must be supplied to the carburetor at a given pressure above carburetor inlet air pressure. Further, this positive differential pressure must be maintained within close limits, for example, one-half pound variation from the desired differential pressure being allowed when fifteen-pound pressure differentials are required.

In hydraulic power installations it is customary to connect a hydraulic pump to the engine, and connect the pump to a source of hydraulic fluid. This pump in turn drives a hydraulic motor situated at a fuel tank, which motor in turn drives the fuel pump. Since fuel is not consumed by the engine in direct proportion to the R. P. M. of the engine, means must be provided to control the supply of hydraulic fluid to the hydraulic motor, such that the quantity of fuel may vary through wide limits without affecting the fuel delivery pressure. Some have sought to do this by "starving the suction" to the hydraulic pump to decrease the hydraulic output of the pump. This system has the disadvantage of subjecting the inlet side of the pump to suction, inducing air to enter the hydraulic system, and thereby providing an elastic quantity where none is desired. Others have sought to control the fuel supply by "bleeding the pressure" of the hydraulic pump. Up to date this latter type of regulation has been unsuccessful due to undesirable hunting action. The liquid within such a regulator is subject to disturbance from exterior forces such as vibration or acceleration, and such disturbance has often resulted in erratic control of fuel pressure.

It is therefore an object of our invention to provide a satisfactory regulator valve to control the flow of pressure fluid to a hydraulic pump. Another object is to provide a regulator valve which is balanced and subject to operation by slight differential pressures.

A further object is to provide a regulator unit in which there is no free or open liquid surface.

Another object of our invention is to provide a valve which is substantially actuated by the differential pressure of the carburetor intake air and the fuel pressure to the carburetor.

Still another object is to provide a regulator valve free from hunting, and independent of pulsations in the hydraulic fluid and in the fuel supply line.

Figure 2:
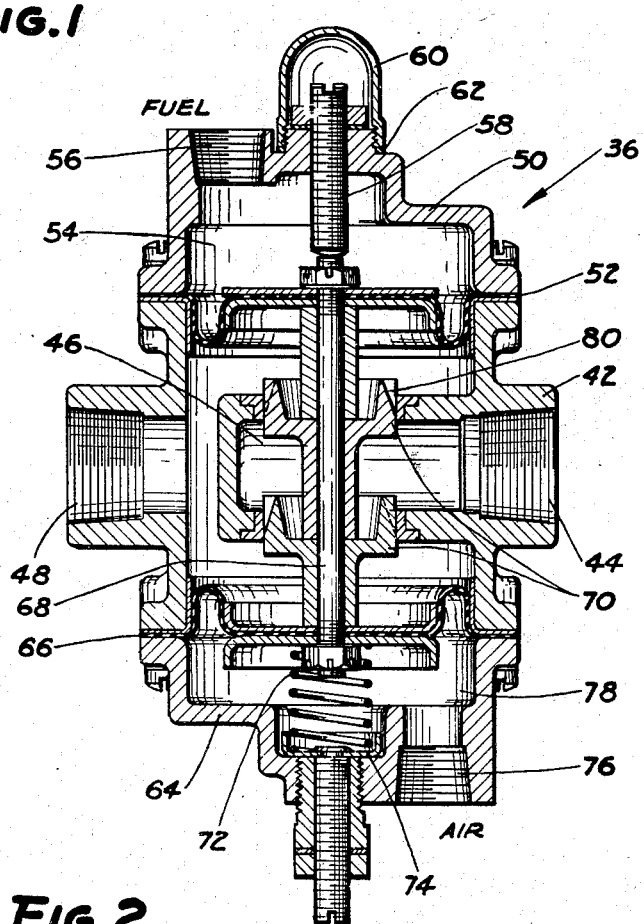

Further objects and advantages of our invention will be apparent in the following description and claims, best considered in conjunction with the accompanying drawing in which:

Figure 1 is a sectional view of an airplane equipped with a hydraulic fuel supply system wherein the regulator valve forming this invention is employed; and Figure 2 is a sectional view of the regulator valve embodying this invention.

The invention is shown as applied to an airplane 10, having an engine 12. Air is taken in through a scoop 14 which passes it to an air stack 16 and thence to a carburetor 18 where it is mixed with fuel and then passed to engine 12. Fuel supply tanks 20 may be located in the wings of airplane 10 as shown, or elsewhere as desired. A generator pump 22 driven by the engine 12 receives hydraulic fluid from a reservoir 24 and delivers it into pressure line 26. This motivating fluid drives a hydraulic motor 28 and exhausts into a line 30 connected to a reservoir 24 and the intake of the generator pump 22. Hydraulic motor 28 drives a fuel pump 32 which pumps fuel under pressure to the carburetor 18 through a fuel line 34.

A regulator valve 36, forming the subject matter of this invention, is shown at Figure 2, and is connected to the pressure line 26 and the exhaust line 30. A conduit 38 leading from the stack 16 connects to the bottom of regulator valve 36. A substantially vertical conduit 40 connects the fuel line 34 with the top of regulator valve 36. The regulator valve 36 comprises a central body member 42 containing an inlet port 44 opening into a valve chamber 46 and an outlet port 48 in the opposite side of member 42 which is connected to exhaust line 30. A cap 50 is placed on the upper end of section 42, and separated therefrom by a diaphragm 52. A closed chamber 54 thus formed is connected at threaded aperture 56 to the conduit 40 and to the fuel supply line 34. A stop 58 is threaded into the top of cap 50 to limit the motion of a valve rod 68 attached to diaphragm 52. A cap 60 is screwed over the end of stop 58 against gasket 62 to seal off any possible leakage of fuel around stop 58.

A lower cap 64 secured to the bottom of section 42 is separated therefrom by a diaphragm 66. Diaphragms 66 and 52 are rigidly connected by valve rod 68 retaining two valve members 70 of equal size. A spring 72 is retained in an adjustable cup 74 affixed to cap 64 and presses against diaphragm 66 and valve rod 68. A port 76 connects a chamber 78 formed by cap 64 to stack conduit 38.

Valve members 70 have tapered slots 80. As the differential pressure between chambers 54 and 78 displaces valve rod 68 against the resiliency of spring 72, valve members 70 move off their seats and open a passage between inlet hydraulic port 44 and outlet hydraulic port 46 to bypass hydraulic fluid. The greater the displacement of valve rods 70 with respect to their seats, the greater the passage of fluid through slots 80 in said valve members. Placing the fuel chamber 54 on the top of regulator valve 36 allows any air or vapor bubbles to vent out the substantially vertical conduit 40.

To start the engine 12 the pilot of the aircraft operates a lever 90 to cause a starting and emergency hand pump 92 to pass fuel into fuel line 34. This operation supplies the carburetor with the necessary starting fuel pressure, and as the engine is turned over by its starter, fuel will be supplied to the engine 12. Once the engine is started, it drives generator pump 22, forcing hydraulic fluid through line 26 to hydraulic motor 28, from whence it exhausts to exhaust line 30 and reservoir 24, and thence back to the inlet of generator 22. Hydraulic motor 28 drives fuel pump 32 which takes fuel from fuel tank 20 and pumps it through line 34 to carburetor 18. The carburetor 18 mixes fuel with the incoming air from scoop 14 in the usual manner and supplies it to the motor 12. When the fuel pressure exceeds a predetermined amount over the stack pressure, it will cause regulator valve 36 to bypass hydraulic fluid from the high pressure line 26 to the low pressure line 30.

The operation of hydraulic regulator valve 36 is as follows. Spring 72 is adjusted in compression against stop 58 to give valve actuation at the desired pressure. As the fuel pressure in chamber 54 exceeds the air stack pressure in chamber 78 by an amount sufficient to overcome the compression of spring 72, diaphragms 52 and 66 will cause valve rod 68 to move downward unseating valves 70 and allowing high pressure fluid to pass to exhaust port 48. This bypassing of high pressure hydraulic fluid causes less fluid to pass to hydraulic motor 28 which in turn causes fuel pump 32 to pump less fuel, reducing the fuel pressure in line 34 and conduit 40, and consequently in chamber 54. The fuel delivery pressure to the carburetor is thus maintained at the desired value above the pressure in the carburetor air stack irrespective of the quantity of fuel required by the carburetor.

The response of the valve 36 is instantaneous and hunting is avoided because the amount of hydraulic fluid passed through the valve slots 80 depends upon displacement of valve members 70. Regulator valve 36 will not be influenced by pulsations in the hydraulic circuit since any such pulsations will act in opposite directions on the two valve elements so as to neutralize their effect.

Although the invention has been described with reference to a particular embodiment thereof, it is not limited to this embodiment nor otherwise, except by the terms of the following claims.

We claim:

1. A hydraulic fluid regulator valve comprising a body having a pair of chambers therein each in communication with one of two sources of pressure, a chamber intermediate said pair of chambers and having openings to hydraulic fluid, a pair of spaced valve ports in said intermediate chamber, a pair of spaced cylindrical tandem valve members mounted coaxially on a stem and each having a plurality of circumferentially spaced parallel-sided slots formed thereon which taper from the cylindrical face of each valve member toward the axis of said stem, a pair of spaced non-resilient rolling-type diaphragms each mounted on said stem and held between a cup-shaped member and a circular disk and having a single preformed annular groove therein, said diaphragms forming two walls of said intermediate chamber and one wall of each of said pair of chambers, the outer annular surface of said diaphragms being in contact with the inner wall of said casing and the inner annular surface of said diaphragms being in contact with the cup-shaped members to provide substantially constant effective pressure areas on said diaphragms, said stem and tandem valve members being movable in response to a pressure differential across the outer faces of said diaphragms to vary the openings of the ports in said intermediate chamber.

2. A hydraulic fluid regulator valve for a fuel supply system of an internal combustion engine comprising a body having a pair of chambers therein each in communication with one of two sources of pressure, a chamber intermediate said pair of chambers and having openings to hydraulic fluid, a pair of spaced valve ports in said intermediate chamber, a pair of spaced cylindrical tandem valve members mounted coaxially on a stem and each having a plurality of circumferentially spaced parallel-sided slots formed thereon which taper from the cylindrical face of each valve member toward the axis of said stem, a pair of spaced non-resilient rolling-type diaphragms each mounted on said stem and held between a cylindrical supporting member and a circular disk and having a single preformed annular groove therein, said diaphragms forming two walls of said intermediate chamber and one wall of each of said pair of chambers, the outer annular surface of said diaphragms being in contact with the inner wall of said casing and the inner annular surface of said diphragms being in contact with the cylindrical member to provide substantially constant effective pressure areas on said diaphragms, said stem and tandem valve members being movable in response to a pressure differential across the outer faces of said diaphragms to vary the openings of the ports in said intermediate chamber, and spring biasing means to urge said tandem valve members in a direction to close said ports.

GEORGE W. PONTIUS, III.
SCHUYLER L. HANDY.